United States Patent
Castagnoli et al.

(10) Patent No.: US 7,613,128 B2
(45) Date of Patent: Nov. 3, 2009

(54) NODE EXCLUSION WITHIN A NETWORK

(75) Inventors: Neal Castagnoli, Morgan Hill, CA (US); Shahriar Rahman, San Jose, CA (US); Lily Chen, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 3 days.

(21) Appl. No.: 11/733,008

(22) Filed: Apr. 9, 2007

(65) Prior Publication Data

US 2007/0280275 A1 Dec. 6, 2007

Related U.S. Application Data

(60) Provisional application No. 60/809,689, filed on May 31, 2006.

(51) Int. Cl.
*H04L 12/26* (2006.01)
(52) U.S. Cl. .................................. 370/252; 370/395.2
(58) Field of Classification Search ............... 370/229, 370/248, 249, 252, 256, 341, 352, 258, 373, 370/377, 395.2, 400, 395.21, 395.41, 431
See application file for complete search history.

(56) References Cited

U.S. PATENT DOCUMENTS

| 6,038,219 | A | 3/2000 | Mawhinney et al. |
| 6,064,653 | A | 5/2000 | Farris |
| 6,574,216 | B1 * | 6/2003 | Farris et al. .................. 370/352 |
| 2003/0107987 | A1 | 6/2003 | Kinstler |

OTHER PUBLICATIONS

"Wireless mesh network." Wikipedia.org. Apr. 3, 2007. Apr. 9, 2007. http://en.wikipedia.org/wiki/Wireless_mesh_network.
"Mesh networking." Wikipedia.org. Mar. 31, 2007. Apr. 9, 2007. http://en.wikipedia.org/wiki/Mesh_networking.
PCT (US Branch), International Search Report, Dec. 30, 2008, 2 pgs.

* cited by examiner

*Primary Examiner*—Brenda Pham
(74) *Attorney, Agent, or Firm*—Stolowitz Ford Cowger LLP (57) ABSTRACT

In one embodiment, a method involves selecting a connection, and attempting to establish a satisfactory link using that connection. If the link is not established, a reliability indicator associated with the connection is modified, to disfavor use of that connection. If the link is established, the reliability indicator associated with the connection is modified, to favor the use of that connection.

16 Claims, 7 Drawing Sheets

Flowchart 600

Mesh Network 300

Figure 3

Reliability Scale 400

Flowchart 600

Figure 6

Flowchart 700

Figure 7

Flowchart 800

Figure 8

NODE EXCLUSION WITHIN A NETWORK

RELATED APPLICATIONS

This application claims priority from U.S. Provisional Application No. 60/809,689, filed May 31, 2006, which is incorporated herein by reference.

TECHNICAL FIELD

This disclosure relates generally to wireless networks.

BACKGROUND

Mesh networks are made up of a collection of radio nodes organized into sectors. These nodes use encoding schemes to transmit packets to and through each other using available radio frequency spectrum. The purpose of the mesh is to deliver packets from wireless clients and devices attached to the mesh node, via such technologies as Ethernet, cable, etc., to networks to which the mesh is attached, including other wireless networks, corporate wired networks, the Internet, etc.

Mesh networking allows for the automatic determination of the structure of the mesh network. This allows the mesh network to form and heal itself, rather than to require expensive radio frequency (RF) engineering. In the absence of specific configuration, the access point evaluates many potential points of sector attachment, and also potentially to multiple sectors.

The order of attaching is based on metrics that specify an order of desirability. Access points attempt to optimize a network connectivity map to take advantage of changing RF conditions, new nodes added to the network, react to access points that have been disabled or are no longer accessible, etc.

During the formation of the mesh, access points may create trust relations with each other, and potentially to the wired network, a controller on the wired network, etc. Establishing trust relationships can take considerable time, and the act of failing to establish a connection with a highly valued access point should not prevent the access point from connecting to other available nodes. However, it is also possible that failing to establish a trust relationship with another valuable node is temporal. Network elements required to establish the connection may not be available at the trust establishment time, due to a variety of reasons, including planned and unplanned maintenance intervals. In this instance it is desirable to establish a connection through the most highly valued node at some point in the future.

Establishing connections between nodes in the mesh network is, from a networking perspective, an expensive operation, e.g., when a node cannot access the network, or any resources available through the network, like the Internet. Additionally, any device connected to this node is similarly blocked from accessing the greater mesh network or any resources available through the mesh network.

BRIEF DESCRIPTION OF THE DRAWINGS

The accompanying drawings, which are incorporated in and form a part of this specification, illustrate particular embodiments of the invention and, together with the description, serve to explain the principles of the invention.

DESCRIPTION OF EXAMPLE EMBODIMENTS

Overview

In one embodiment, a method involves selecting a connection, and attempting to establish a satisfactory link using that connection. If the link is not established, a reliability indicator associated with the connection is modified, to disfavor use of that connection. If the link is established, the reliability indicator associated with the connection is modified, to favor the use of that connection.

Description

Reference will now be made in detail to several particular embodiments of the invention. While the invention will be described in conjunction with the alternative embodiment(s), it will be understood that they are not intended to limit the invention to these particular embodiments. On the contrary, the invention is intended to cover alternative, modifications, and equivalents, which may be included within the spirit and scope of the invention as defined by the appended claims.

Furthermore, in the following description of example embodiments of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Portions of the description that follows are presented and discussed in terms of a method. Although steps and sequencing thereof are disclosed in a figure herein (e.g., FIG. 6) describing the operations of this method, such steps and sequencing are intended as an example. Embodiments of the present invention are well suited to performing various other steps or variations of the steps recited in the flowchart of the figure herein, and in a sequence other than that depicted and described herein.

Some portions of the descriptions which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "writing," "including," "testing," "using," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in a modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Figure 1:
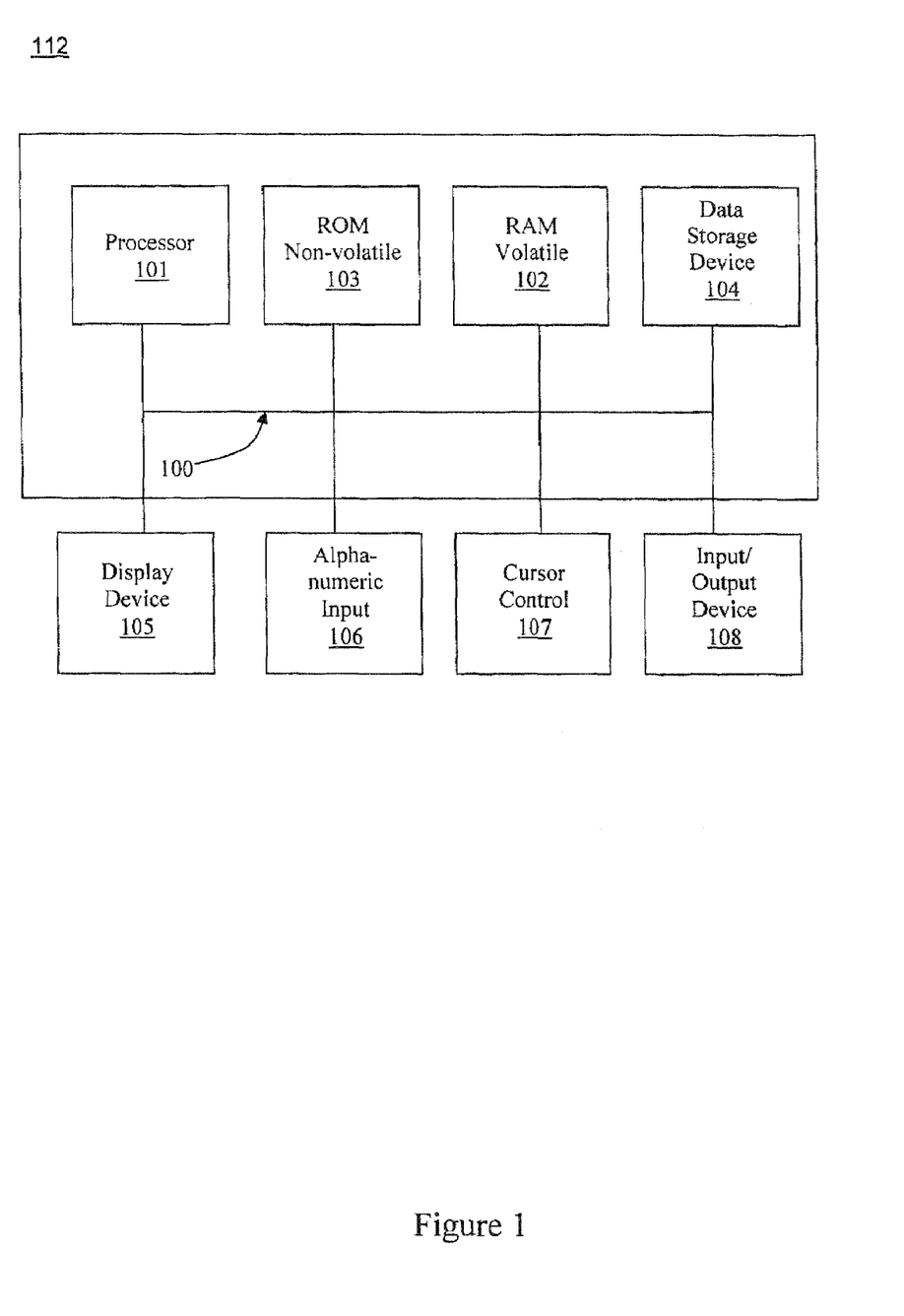
FIG. 1 illustrates an example computer system.

Referring first to FIG. 1, an illustration of example computer system 112 is shown. It is appreciated that computer system 112 described herein illustrates an example configuration of an operational platform upon which particular embodiments of the present invention can be implemented. Nevertheless, other computer systems with differing configurations can also be used in place of computer system 112 within the scope of the present invention. That is, computer system 112 can include elements other than those described in conjunction with FIG. 1.

Computer system 112 includes an address/data bus 100 for communicating information, a central processor 101 coupled with bus 100 for processing information and instructions; a volatile memory unit 102 (e.g., random access memory [RAM], static RAM, dynamic RAM, etc.) coupled with bus 100 for storing information and instructions for central processor 101; and a non-volatile memory unit 103 (e.g., read only memory [ROM], programmable ROM, flash memory, etc.) coupled with bus 100 for storing static information and instructions for processor 101. Computer system 112 may also contain an optional display device 105 coupled to bus 100 for displaying information to the computer user. Moreover, computer system 112 also includes a data storage device 104 (e.g., disk drive) for storing information and instructions.

Also included in computer system 112 is an optional alphanumeric input device 106. Device 106 can communicate information and command selections to central processor 101. Computer system 112 also includes an optional cursor control or directing device 107 coupled to bus 100 for communicating user input information and command selections to central processor 101. Computer system 112 also includes signal communication interface (input/output device) 108, which is also coupled to bus 100, and can be a serial port. Communication interface 108 may also include wireless communication mechanisms. Using communication interface 108, computer system 112 can be communicatively coupled to other computer systems over a communication network such as the Internet, intranet (e.g., a local area network), wireless network, or wireless mesh network.

Figure 2:
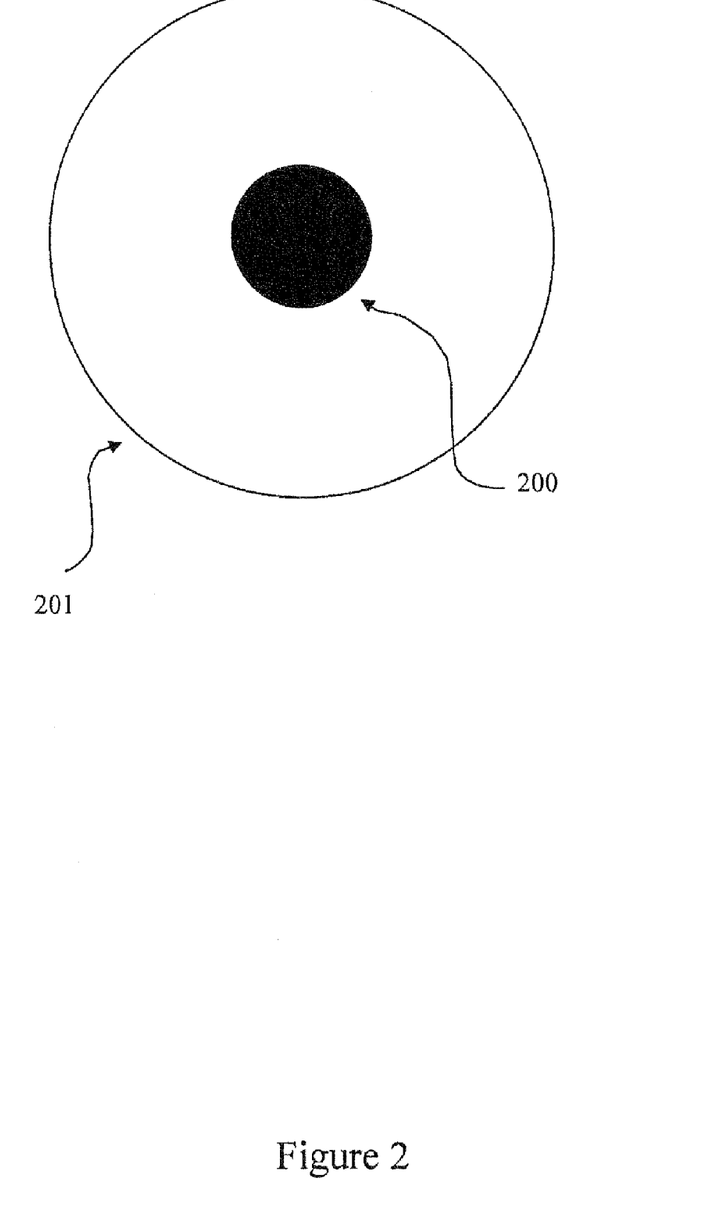
FIG. 2 illustrates an example wireless mesh network node.

With reference now to FIG. 2, an illustration of an example wireless network mesh node 200 is depicted, in accordance with one particular embodiment of the present invention. In particular embodiments, mesh node 200 is configured to send and receive data wirelessly, e.g., using a wireless networking standard, such as 802.11. In some particular embodiments, mesh node 200 is connected to other mesh nodes or other networks using a physical connection. In some particular embodiments, both approaches are utilized.

Mesh node 200, in particular embodiments, is intended to be utilized as part of a wireless mesh network, such as that described below, with reference to FIG. 3. In such embodiments, mesh node 200 can communicate with other mesh nodes or wireless devices, e.g. system 112, when those mesh nodes or wireless devices are within broadcast range of mesh node 200, as shown by circle 201.

In particular embodiments, mesh node 200 is configured to allow a wireless device to connect to it, and through it to a mesh network. Mesh node 200 receives data from the wireless device, or from another mesh node, and forwards it, either to the intended destination, or to another mesh node in the mesh network.

Figure 3:
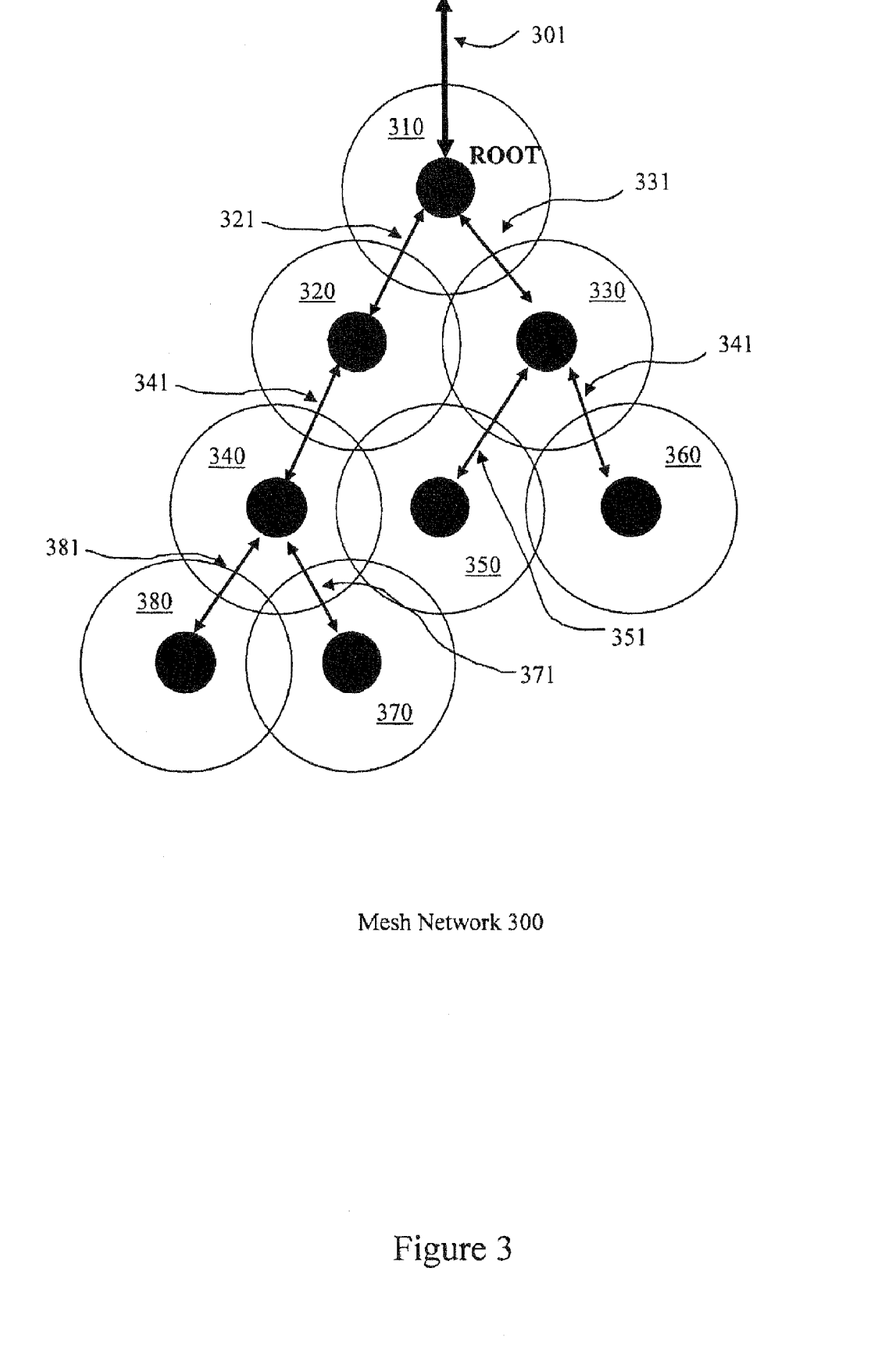
FIG. 3 illustrates an example network.

With reference now to FIG. 3, an illustration of an example wireless mesh network 300 is depicted, in accordance with some embodiments. Wireless mesh network 300, in the depicted embodiment, is composed of a number of mesh nodes 310, 320, 330, 340, 350, 360, 370, and 380. Mesh node 310 is the root node, or "portal," where wireless mesh network 300 can connect to an outside internetworking connection, e.g., the Internet, via connection 301.

Under the example network shown in FIG. 3, every mesh node has a route to the root node, mesh node 310, of wireless mesh network 300. The connections involved in these routes are represented as solid arrows, such as arrow 321. When a node cannot connect directly to the root node, it connects to another node with a connection, direct or indirect, to the root node. For example, node 350 connects to node 330, which in turn is directly connected to the root node 310, while node 370 connects to node 340, which has an indirect connection to the root node 310 by way of node 320.

Is understood that while example wireless mesh network 300 is shown as incorporating certain specific enumerated features, embodiments are well suited for application with a variety of different network structures. For example, embodiments can be implemented in networks that utilize the Adaptive Wireless Past Protocol (AWPP), the lightweight access point protocol (LWAPP), or any other networking protocol, and/or with a variety of network hierarchies, including but not limited to tree based routing (TBR) and ad hoc distance vectoring (AODV). Moreover, embodiments have applications outside the field of mesh networks.

When a node is first brought into a mesh network, or when the node loses its connection to a neighboring node, the node attempts to establish a connection to the mesh network. In situations where the node has multiple possible connections, e.g., the node has several neighbors within connection range, one of those neighbors is selected to attempt to connect to. In different embodiments, different selection criteria are used to determine which neighbor to attempt to establish a connection with, e.g., random determination, or any of several factors which make one connection more attractive than another.

Some embodiments seek to identify neighboring nodes which are known to be reliable and to avoid those which have a history of being unreliable. If the node attempts to connect to a neighbor and is unable to do so, or if, upon connection to the neighbor, the neighboring node is bad in some way, some embodiments act to discourage further attempts to connect to that particular neighboring node. In some embodiments, when a node has established the neighboring node as reliable, the node allows forgiveness to the neighboring node for occasional offenses, such as when the node for whatever reason has stopped servicing traffic.

In a scenario such as the one described above, where a node has multiple neighboring nodes, and hence multiple possible connections, it is expensive to retry a failed connection, if one of the other connections would have succeeded. Some embodiments try to avoid retrying failed connections through the use of exclusion lists. If a particular connection is attempted and fails, for whatever reason or under whatever criteria, that connection is placed on an exclusion list, and will not be tried again until its conviction period, e.g., the time the connection is "sentenced" to spend on the exclusion list, has elapsed. (In some embodiments, if all possible connections have been placed on exclusion lists, some or all exclusion lists are cleared, rather than waiting for a connection to finish its conviction period.)

Some embodiments include an idea of historical reliability. By extending the exclusion list concept described above with historical data on a connection's past reliability, a node can begin to avoid unreliable connections, even if they are otherwise attractive, in favor of connections with proven reliability. In some embodiments, this is accomplished by convicting failed connections for progressively longer amounts of time, while progressively reducing the amount of time a reliable connection would spend on an exclusion list.

Figure 4:
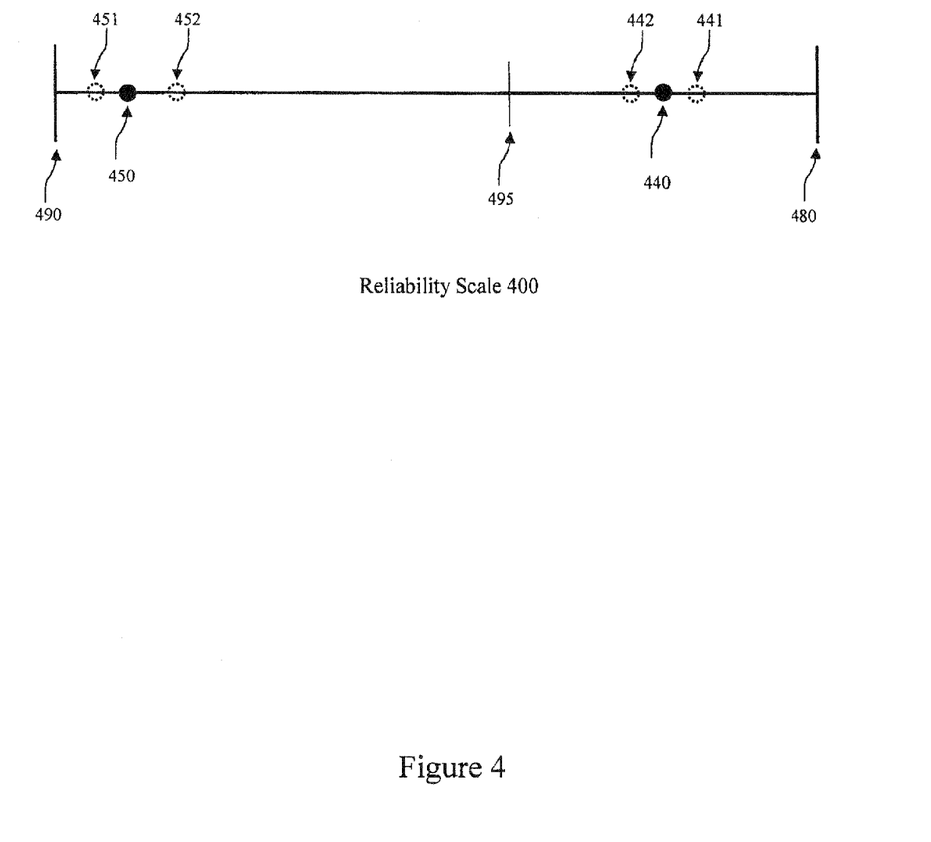
FIG. 4 illustrates an example reliability scale.

With reference now to FIG. 4, an illustration of an example reliability scale is depicted, in accordance with one embodiment. Reliability scale 400, as shown, ranges between a minimum value 480 and a maximum value 490. What these minimum and maximum values represent will vary by embodiment. In some embodiments, for example, these values correlate to the amount of time a particular connection will spend on an exclusion list, or the conviction period of that particular connection. Reliability scale 400 also includes a default value 495, which corresponds to the amount of time a previously-unevaluated connection would spend on an exclusion list.

Reliability scale 400 is also shown with several nodes positioned along the scale, e.g., nodes 440 and 450. As depicted, node 440 has been advanced from default value 495 towards minimum value 480, which suggests that node 440 has had a reliable past history, and so should spend less time on an exclusion list van and unknown or unreliable node. Should node 440 continue to have reliable performance, it may be advanced to position 441 at some later time. If node 440 should experience an unexpected outage, its reliability may suffer, and it may be shifted to position 442. Similarly, node 450 has been shifted towards maximum value 490, which suggests that connections to node 450 have been unreliable in the past. If, in the future, node 450 continues to be unreliable, it may be shifted even further towards maximum value 490, such as to position 451. If node 450 becomes more reliable, it may be advanced back towards default value 495, e.g., to position 452.

It is understood that reliability scale 400 is illustrative in nature. Implementations of the underlying concept illustrated by reliability scale 400 will vary across embodiments. In one example embodiment, for example, the conviction period for a connection is determined by a exponential function; in this embodiment, the node would alter the exponent used in evaluating the function, to adjust the relative reliability of a particular connection. In other embodiments, other approaches can be utilized.

Additionally, the behavior necessary to merit adjustments to a particular connection's reliability will vary by embodiment. For example, in one embodiment, shifting a connection towards the "more reliable" end of the scale will require progressively greater reliability; e.g., a connection which has proved reliable for one hour may be shifted one degree up from the default value, but may require one day of reliability to be shifted up an additional degree.

Figure 5:
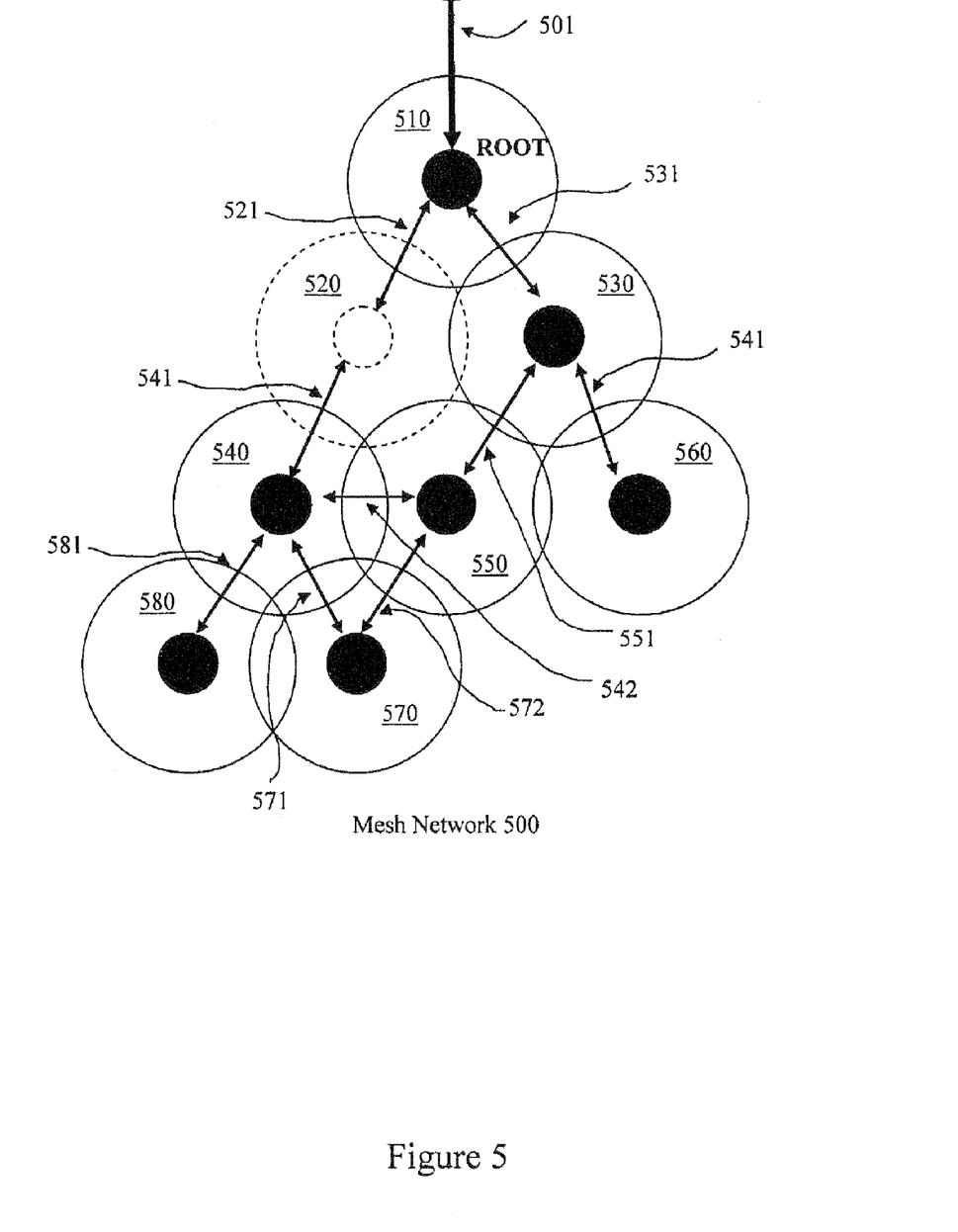
FIG. 5 illustrates an example network undergoing an outage.

With reference now to FIG. 5, an illustration of an example wireless mesh network 500 is depicted, in accordance with some embodiments. Mesh network 500, as they could, comprises nodes 510, 520, 530, 540, 550, 560, 570, and 580, with node 510 as the root node for the network. In the depicted embodiment, node 520 is presently unavailable, e.g., through a service outage.

Node 540, as depicted, has two available connections to attempt to reach root node 510, connection 541 to node 520, and connection 542 to node 550. Similarly, node 570 has two available connections to reach root node 510, connection 571 to node 540, and connection 572 to node 550.

If, under whatever selection mechanism is used in mesh network 500, node 540 finds connection 541 more attractive than connection 542, node 540 would attempt first to establish connection 541 to node 520. While node 540 is attempting to establish connection 541, other nodes which connect to node 540, e.g., node 580, will last be able to reach root node 510 either. In some embodiments, if node 520 is consistently unreliable, it is more beneficial to use connection 542, even though connection 541 may appear more favorable. In order to prevent node 540 from continually attempting to connect to node 520, thereby disrupting service in the portions of mesh network 500 which connect to node 540, a reliability factor can be used to place connection 541 in progressively longer conviction periods. Conversely, if connection 541 has historically been reliable, a short-term outage will not require an overly lengthy conviction; in this way, embodiments allow for identification of a true "honeypot" scenario, as opposed to temporary outages of trusted connections. A honeypot is not reliable, and therefore receive progressively longer conviction periods, while a temporary outage of a trusted connection will not be unduly penalized.

A similar mechanic applies to node 570. Node 570 can connect to either nodes 540 or 550, through connections 571 or 572, respectively. However, if node 540 relies upon connection 541 to reach root node 510, and node 520 is unreliable, then connection 571 is similarly unreliable. Thus when node 520 is down, and when node 540 attempts to establish a connection, node 570 will be unable to reach root node 510. Accordingly, connection 571, in some embodiments, could be given a progressively less reliable value, such that any time connection 571 fails, it will receive a progressively greater conviction period.

Figure 6:
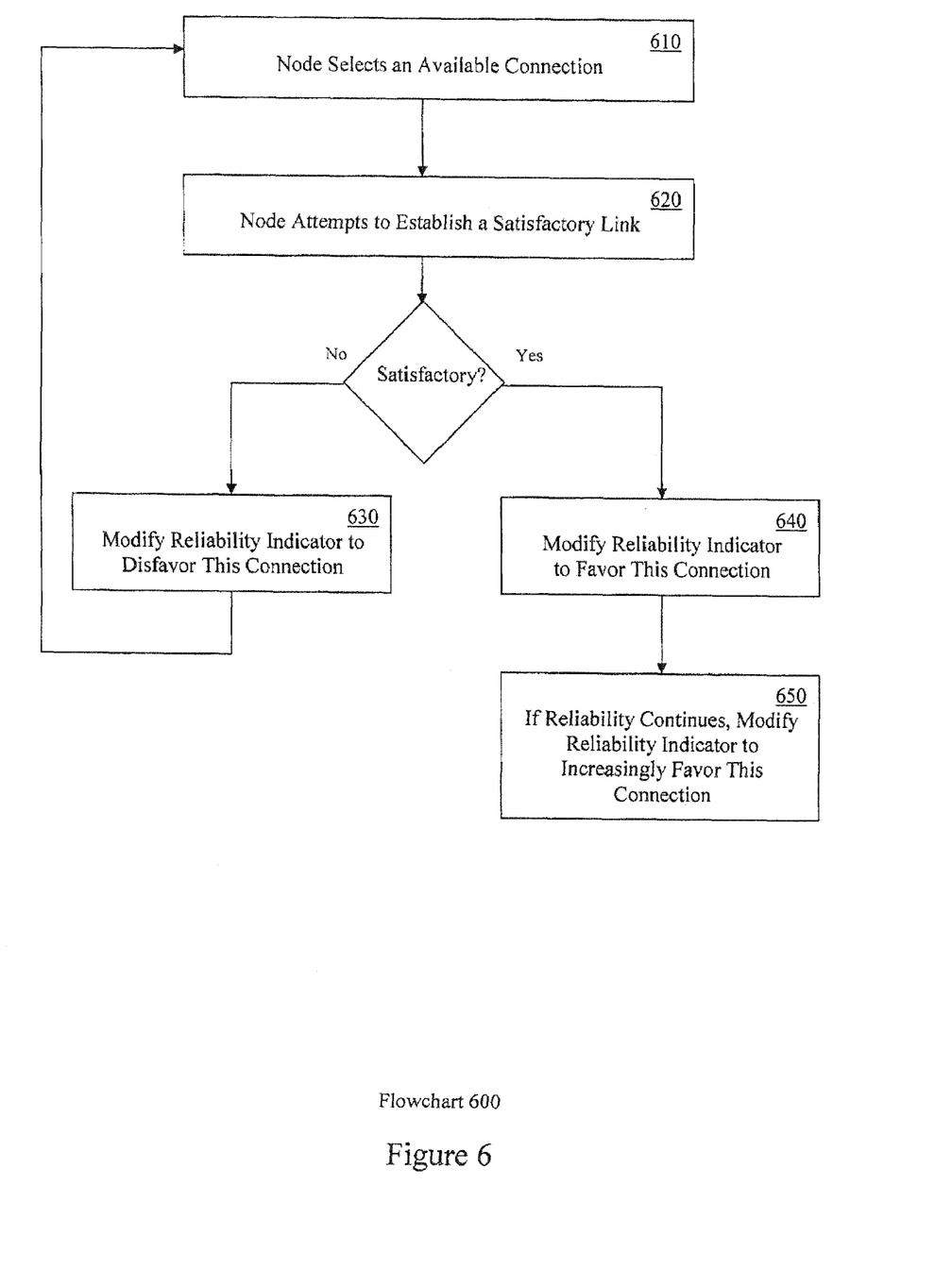
FIG. 6 illustrates an example method of determining connection reliability.

With reference now to FIG. 6, a flowchart 600 of an example method of determining connection reliability is depicted, in accordance with one particular embodiment. Although specific steps are disclosed in flowchart 600, such steps are intended as an example. That is, particular embodiments of the present invention are well suited to performing various other (additional) steps or variations of the steps recited in flowchart 600. It is appreciated that the steps in flowchart 600 may be performed in an order different than presented, and that not all of the steps in flowchart 600 may be performed.

With reference to step 610, a network node selects from a plurality of available connections. In some embodiments, the network node selects one of the available connections. The method of selection utilized will vary across different embodiments, and different particular embodiments are well suited for use with a wide variety of selection methods and criteria.

In some embodiments, connections on an exclusion list, or similarly unavailable, are not among the plurality of available connections. In several such embodiments, when a node has no available connections, e.g., because all connections are presently on an exclusionist, some or all conviction periods may be commuted, such that one or more connections becomes available for selection. In an embodiment where only one connection is ever available to the note, e.g., the node only has one possible neighbor to connect to, that single possible connection would always be selected, and may not be placed on an exclusion list.

In some embodiments, where a system of selection involving preferred or attractive connections is utilized, when a connection deemed preferable to the connection currently in use comes off of an exclusion list, the node may select that preferred connection, thereby triggering this method. In some embodiments, when a node is powered on or reset, it may perform this method. In some embodiments, if a node loses its existing connection, or if the connection is no longer satisfactory, it may perform this method. In other embodiments, additional or alternative reasons may exist for performing this method.

For example, with reference to the FIG. 5, node 540 has four neighbors, e.g., nodes 520, 550, 570, and 580. Note 540 has four connections to select from, e.g., connections 541, 542, 571, and 581. If, for example, connection 541 was currently on an exclusion list, then node 540 would select from the remaining available connections, using whatever selection method the node is configured to utilize.

With reference now to step 620, the node attempts to establish a satisfactory link using the select a connection. What constitutes a satisfactory link will vary across different embodiments. In some embodiments, for example, it may be sufficient for the node to be able to communicate with its neighbor, e.g., in a mesh network. In other embodiments, in order for the link to be satisfactory, the node and a need to be able to reach a remote destination through that link, e.g., access to a root portal or the Internet by means of the connection. In some embodiments, latency factors or stability of the link may impact whether it is satisfactory or not. In some embodiments, the link may not persist long enough to be deemed satisfactory, e.g., the link may be established for five minutes, where to be satisfactory it must persist for at least one hour. In other embodiments, other factors may be evaluated to determine whether a link is satisfactory.

For example, if node 540 selected connection 541, connection 541 may not be a satisfactory link, as node 520 is currently down, and so no connection could be established. If node 540 selected connection 581, connection 581 may or may not be deemed a satisfactory link; from the connections illustrated in mesh network 500, it appears that a connection to node 580 would not allow access to the remainder of the mesh network, or to the root portal.

With reference now to step 630, if the link is determined to be unsatisfactory, a reliability indicator associated with the selected connection is modified, in a manner such that the connection is disfavored, relative to an unmodified connection. In some embodiments, this is accomplished by placing a connection on an exclusionist for longer than some default period of time, where the default time would be for a connection with an unmodified reliability indicator. In several embodiments utilizing this approach, the reliability indicator serves as an initial filter, as connections placed on exclusion lists for longer periods of time are not available to the selection process. In other embodiments, other means of indicating disfavor with a particular connection can be utilized, e.g., modifying an attribute associated with the connection, to influence the initial selection process.

For example, if the equation depicted below in Table 1 were used to determine the length of time a connection stays on an exclusion list, one particular approach could involve modifying the exponent y in the equation.

TABLE 1

$$\text{ConvictionPeriod} = a * 2^y$$

a = Exclusion List Coefficient (Default Conviction Period)
$y$ = Reliability Indicator for Selected Connection If the link using that connection were deemed unsatisfactory, an increase in y would result in a longer period of time spent on an exclusion list. If, at some later time, that connection was selected again, and the link again proves unsatisfactory, the exponent y could be further increased, to further reduce the likelihood of that connection being selected. It is understood that the equation of Table 1 is an example only; embodiments are well suited for a variety of approaches, including different methods of determining conviction periods.

In the embodiment depicted in FIG. 6, after a particular link has been deemed unsatisfactory, the method returns to the selection phase, and an available connection is again selected.

For example, if node 540 selected connection 541, and connection 541 was deemed unsatisfactory, e.g., because node 520 is unavailable, a reliability indicator associated with connection 541 would be modified. If the equation of Table 1 was in use in mesh network 500, the exponent y might be set from 0 to 1, such that connection 541 would receive a conviction period of 2a, rather than the default conviction period of a. If, after connection 541 has served out its conviction period, node 540 again selects connection 541 and it again proves unsatisfactory, the exponent y may be further increased, leading to exponentially longer conviction periods.

With reference now to step 640, if a satisfactory link is established, a reliability indicator associated with a selected connection may be modified to favor that connection. In some embodiments, this is accomplished by modifying a reliability indicator such that that particular connection would spend less time on an exclusion list than a connection with an unmodified reliability indicator. In this matter, should the connection be placed on an exclusionist for some reason, e.g., the connection is temporarily broken, it will be removed from the exclusionist faster, and therefore be available for selection more rapidly than a less favored connection under similar circumstances. In other embodiments, this is accomplished by different means, e.g., modifying an attribute associated with the connections such that the connection is more likely to be selected during the selection process.

If, for example, the equation of Table 1 were utilized in determining length of conviction periods, then the exponent y could be decreased in a way that would shorten the length of the conviction period assigned to that particular connection, e.g., from a default value of y=0 to y=−1, with the corresponding drop in conviction period length.

For example, if node 540 selects connection 542, and connection 542 provides a satisfactory link, then a reliability indicator associated with connection 542 could be modified, in such a way that connection 542 would spend less time on an exclusion list than a connection not so modified.

With reference now to step 650, if a satisfactory link continues to prove reliable, the reliability indicator associated with that link is further modified to increasingly favor this connection. This is accomplished in different ways, in different embodiments. In some embodiments, for example, a separate timer process is used to track how long a satisfactory link persists. The longer the link remains unsatisfactory, the more "credit" is built up for that link, such that a link with a long history of reliability will spend much less time on an exclusion list than a length without such a demonstrable reliable history. In other embodiments, a reliability attribute associated with a particular connection may be further modified, such that the selection of that particular connection over another connection during the selection process is increasingly likely.

In some embodiments, increasing "credit" for a reliable connection becomes progressively more difficult, as the associated conviction period decreases. For example, a link may only have to be satisfactory for one hour for the first adjustment to its reliability factor, but may have to be satisfactory for a full day before a second adjustment to the reliability factor, and so on. If the equation of Table 1 is utilized, then changing y from 0 to −1 may occur after 10 minutes of reliable service, from −1 to −2 after an hour, and from −2 to −3 after a day, and so on. In this way, the method "rewards" reliable connections, by making them increasingly likely to be available during the selection process, while "punishing" historically unreliable connections, by making them increasingly unlikely to be available during the selection process.

For example, if node 540 had previously used connection 541 for a substantial length of time, before node 520 went off-line, connection 541 and they have built up a substantial amount of "credit" with node 540. Accordingly, connection 541 would spend a relatively short time on an exclusion list, before node 540 would treat the connection as available.

Figure 7:
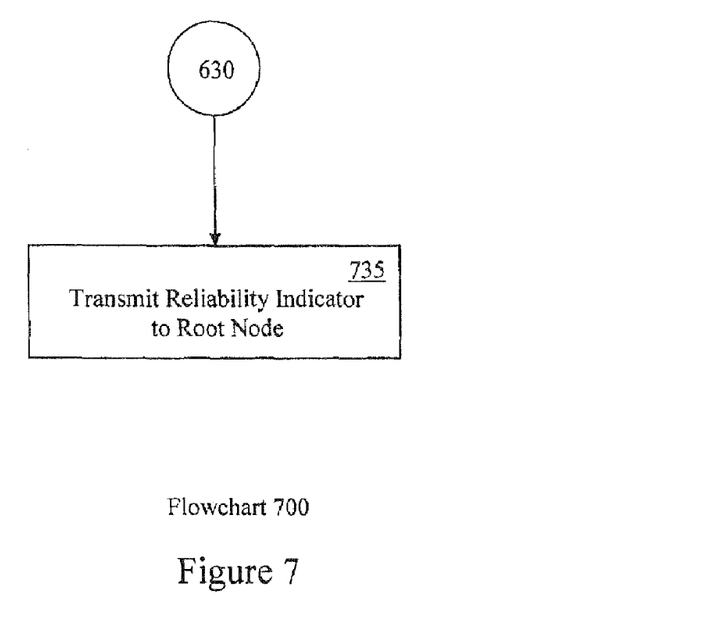
FIG. 7 illustrates an example method of sharing reliability indicators with a parent node.

With reference now to FIG. 7, a flowchart 700 depicts an example method of sharing reliability indicators with a parent node, in accordance with one particular embodiment. Although specific steps are disclosed in flowchart 700, such steps are intended as an example. That is, particular embodiments of the present invention are well suited to performing various other (additional) steps or variations of the steps recited in flowchart 700. It is appreciated that the steps in flowchart 700 may be performed in an order different than presented, and that not all of the steps in flowchart 700 may be performed.

As depicted, flowchart 700 continues from step 630 of flowchart 600. In step 735, the node transmits the reliability indicator associated with a selected connection to the root node of a mesh network. In some embodiments, this transmission can be delayed until a satisfactory link has been established. In some other embodiments, the node may be able to transmit at other times.

By providing the root node with the reliability indicators determined by the methods of flowcharts 600 and 700, some embodiments allow for rapid detection of problems within the mesh network, e.g., if a number of nodes surrounding one troubled node report back increasingly worse reliability indicators for connections to that troubled node, a system administrator may be able to detect problems more rapidly than previously.

While flowchart 700 depicts step 735 as following step 630, in some embodiments a node may also report back reliability indicators associated with satisfactory links, e.g., step 735 follows step 650. In other embodiments, such transmission may occur at different points within the method.

Figure 8:
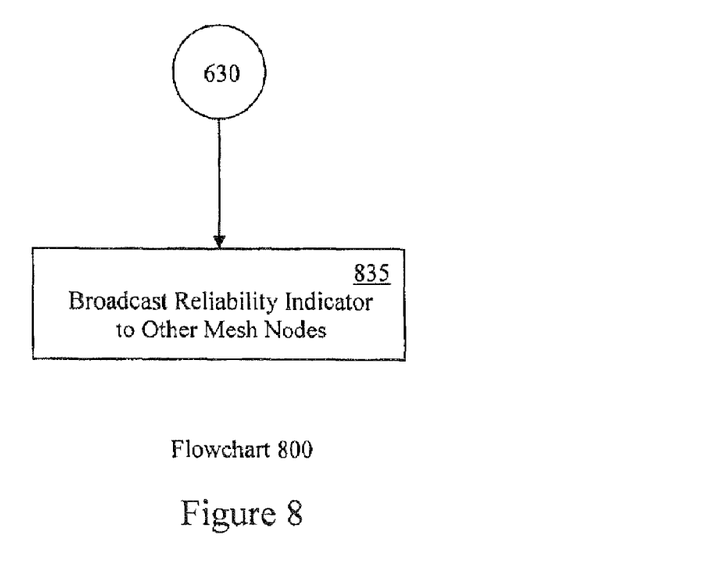
FIG. 8 illustrates an example method of sharing reliability indicators across a network.

With reference now to FIG. 7, a flowchart 800 depicts an example method of sharing reliability indicators across a mesh network, in accordance with one particular embodiment. Although specific steps are disclosed in flowchart 800, such steps are intended as an example. That is, particular embodiments of the present invention are well suited to performing various other (additional) steps or variations of the steps recited in flowchart 800. It is appreciated that the steps in flowchart 800 may be performed in an order different than presented, and that not all of the steps in flowchart 800 may be performed.

As depicted, flowchart 800 continues from step 630 of flowchart 600. In step 835, the node transmits the reliability indicator associated with a selected connection to other nodes within the network. In some embodiments, this transmission can be delayed until a satisfactory link has been established. In some other embodiments, the node may be able to transmit at other times. In some embodiments, the node may be able to broadcast to neighboring nodes directly. In some embodiments, the node may be able to broadcast to neighboring nodes by first sending messages to the root node for the network, which would then distribute messages back down the network structure to the destination nodes.

By providing other nodes with the reliability indicators determined by the methods of flowcharts 600 and 800, some embodiments allow for a more rapid "healing" process within the network structure, in case of a partial outage. For example, if one node experiences continually unsatisfactory links using a particular connection to second node, it may be able to share its reliability indicators for that connection with other nodes which would attempt to connect to that second node as well. Given those reliability indicators, those other nodes may choose to avoid connections to that second node, essentially learning from the first node's experience, and avoiding failed connection attempts of their own.

While flowchart 800 depicts step 835 as following step 630, in some embodiments a node may also report back reliability indicators associated with satisfactory links, e.g., step 835 follows step 650. In other embodiments, such transmission may occur at different points within the method.

Particular embodiments of the present invention are thus described. While the present invention has been described in particular embodiments, it should be appreciated that the present invention should not be construed as limited by such particular embodiments, but rather construed according to the following claims.

What is claimed is:

1. A computer readable memory encoded with instructions that, if executed, result in:
   selecting, using a node of a mesh network, a first connection;
   attempting to establish a satisfactory link using said first connection;

modifying a reliability indicator associated with said first connection and stored on the node to disfavor further selection of said first connection by the node, if said satisfactory link is not established;

modifying said reliability indicator associated with said first connection and stored on the node to favor further selection of said first connection by the node, if said satisfactory link is established; and placing said first connection on an exclusion list stored on the node, if said satisfactory link is not established.

2. The computer readable memory of claim 1, wherein the instructions, if executed, result in transmitting said reliability indicator associated with said first connection to a parent node in the mesh network.

3. The computer readable memory of claim 1, wherein the instructions, if executed, result in transmitting said reliability indicator associated with said first connection to a neighboring node in the mesh network.

4. The computer readable memory of claim 1, wherein said reliability indicator is utilized to determine a period of time said first connection will be placed on said exclusion list.

5. The computer readable memory of claim 4, wherein said modifying said reliability indicator associated with said first connection to disfavor further selection of said first connection comprises causing said period of time to be greater.

6. The computer readable memory of claim 4, wherein said modifying said reliability indicator associated with said first connection to favor further selection of said first connection comprises causing said period of time to be less.

7. The computer readable memory of claim 6, wherein the instructions, if executed, result in:

additionally modifying said reliability indicator associated with said first connection to progressively decrease said period of time, if said satisfactory link persists for a specified time frame.

8. An apparatus, comprising:

a first node; and a plurality of connections, communicatively coupled to said first node, for allowing said first node to transmit and receive data from a plurality of additional nodes in a mesh network;

wherein said first node is configured to select a first connection of said plurality of connections, attempt to establish a satisfactory link using said first connection, and modify a reliability indicator associated with said first connection, such that said first connection is disfavored if said satisfactory link is not established, and said first connection is favored if said satisfactory link is established; and wherein said first node is further configured to transmit said reliability indicator associated with said first connection to a parent or neighbor node in said mesh network.

9. The apparatus of claim 8, wherein said first node is further configured to additionally modify said reliability indicator associated with said first connection to increasingly favor further selection of said first connection, if said satisfactory link persists for a specified time frame.

10. An apparatus, comprising:

a first node; and a plurality of connections, communicatively coupled to said first node, for allowing said first node to transmit and receive data from a plurality of additional nodes in a mesh network;

wherein said first node is configured to select a first connection of said plurality of connections, attempt to establish a satisfactory link using said first connection, and modify a reliability indicator associated with said first connection, such that said first connection is disfavored if said satisfactory link is not established, and said first connection is favored if said satisfactory link is established; and wherein said first node is further configured to place said first connection on an exclusion list if said satisfactory link is not established.

11. The apparatus of claim 10, wherein said reliability indicator is utilized to determine a period of time said first connection will be placed on said exclusion list.

12. The apparatus of claim 11, wherein said first node is further configured to modify said reliability indicator associated with said first connection, such that said first connection is disfavored by causing said period of time to be greater.

13. The apparatus of claim 11, wherein said first node is further configured to modify said reliability indicator associated with said first connection, such that said first connection is favored by causing said period of time to be less.

14. The apparatus of claim 13, wherein said first node is further configured to additionally modify said reliability indicator associated with said first connection to progressively decrease said period of time if said satisfactory link persists for a specified time frame.

15. An apparatus comprising:

a first means for receiving and transmitting data across a network; and a plurality of means for transmission of data, communicatively coupled to said first means for receiving and transmitting, for allowing said first means for receiving and transmitting to communicate with a second means for receiving and transmitting data, wherein said first means for receiving and transmitting data is configured to select a first means for transmission of data of said plurality of means for transmission of data, attempt to establish a satisfactory link to said second means for receiving and transmitting using said first means for transmission of data, and modify a reliability indicator associated with said first means for transmission of data, such that said first means for transmission of data is disfavored if said satisfactory link is not established, and said first means for transmission of data is favored if said satisfactory link is established;

wherein said first means for receiving and transmitting data is further configured to transmit said reliability indicator associated with said first means for transmission of data to a root mesh node or other mesh node in a mesh network.

16. The apparatus of claim 15, wherein said first means for receiving and transmitting data is further configured to additionally modify said reliability indicator associated with said first means for transmission of data to increasingly favor further selection of said first means for transmission of data, if said satisfactory link persists for a specified time frame.

* * * * *